Figure 1:
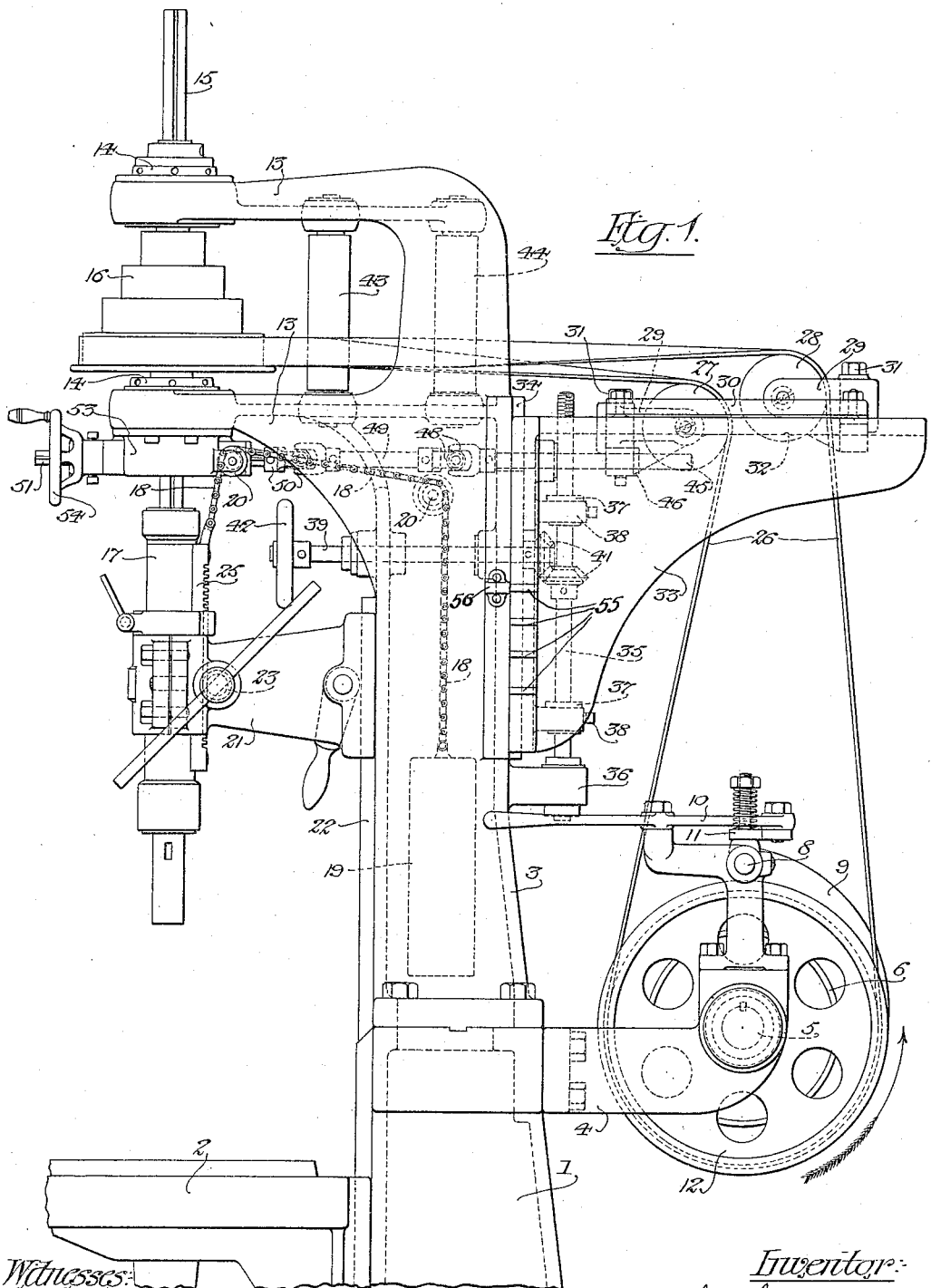

J. G. HEY.
BELT GEARING FOR DRILL PRESSES AND THE LIKE.
APPLICATION FILED JULY 13, 1914.

1,148,677.

Patented Aug. 3, 1915.
3 SHEETS—SHEET 1.

Witnesses:

Inventor:
John G. Hey
by Pearce, Fisher & Clapp
Attys.

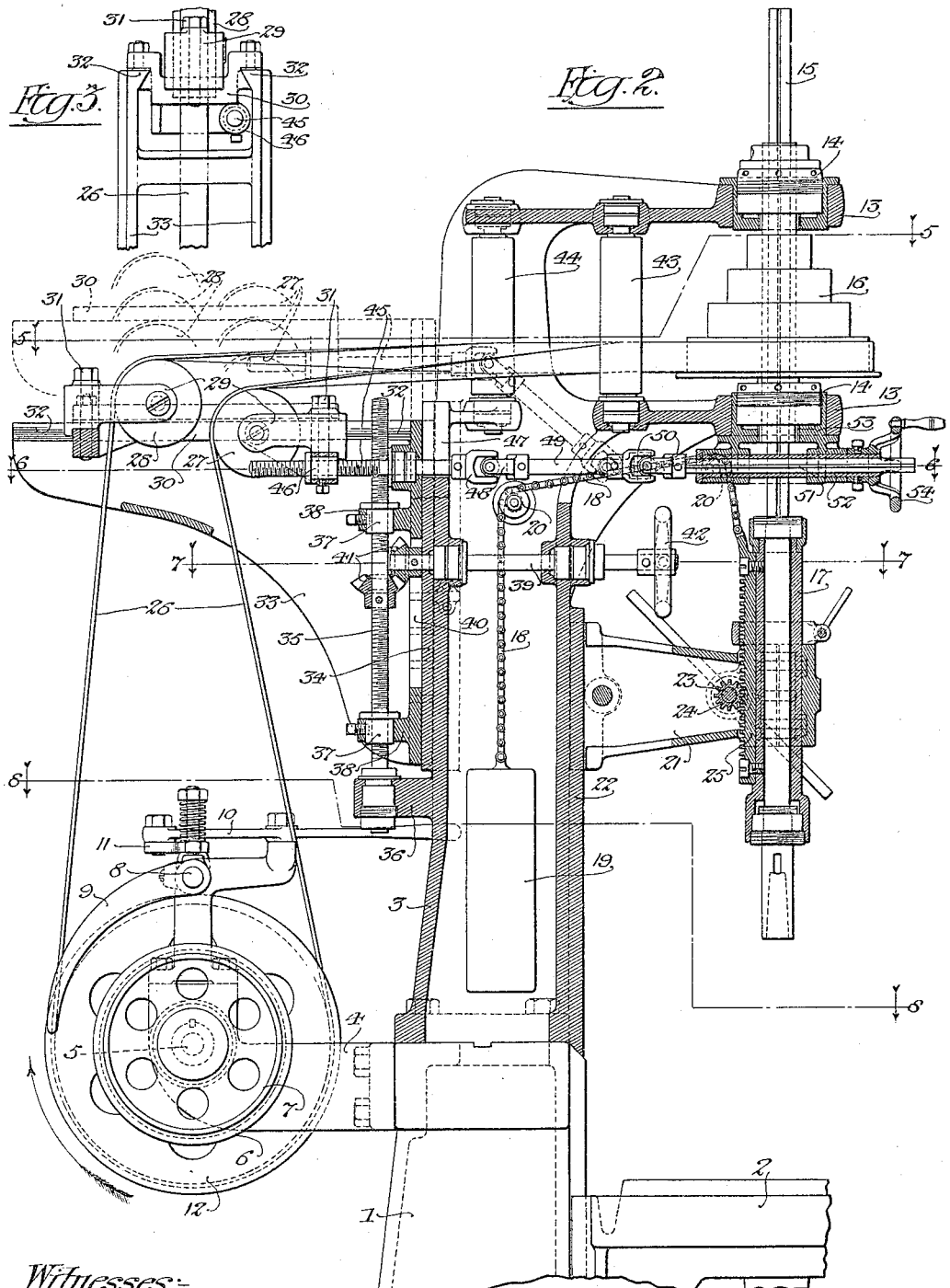

J. G. HEY.
BELT GEARING FOR DRILL PRESSES AND THE LIKE.
APPLICATION FILED JULY 13, 1914.
1,148,677.
Patented Aug. 3, 1915.
3 SHEETS—SHEET 3.
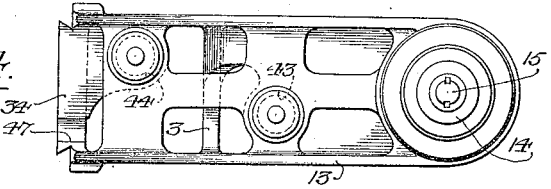
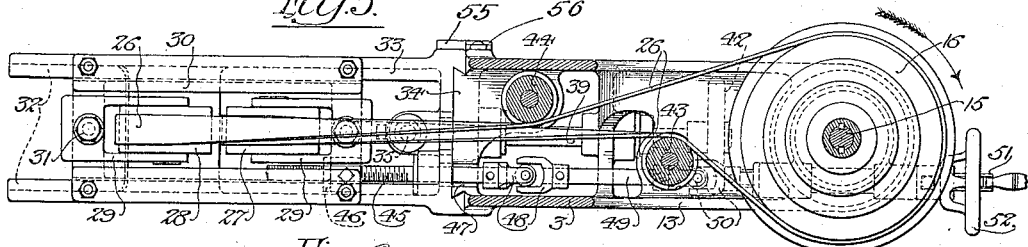

UNITED STATES PATENT OFFICE.

JOHN G. HEY, OF CINCINNATI, OHIO, ASSIGNOR TO CINCINNATI PULLEY MACHINERY COMPANY, OF CINCINNATI, OHIO, A CORPORATION.

BELT-GEARING FOR DRILL-PRESSES AND THE LIKE.

1,148,677.  Specification of Letters Patent.  Patented Aug. 3, 1915.

Application filed July 13, 1914. Serial No. 850,750.

*To all whom it may concern:*

Be it known that I, JOHN G. HEY, a citizen of the United States, and a resident of Cincinnati, Ohio, have invented certain new and useful Improvements in Belt-Gearing for Drill-Presses and the like.

The invention relates to belt gearing for drill presses and like machines, and seeks to provide a simple, effective construction which can be easily and readily adjusted to drive the drill spindle at different speeds through the medium of a single, quarter-turn belt.

The invention consists of the features of improvement hereinafter set forth, illustrated in the preferred form in the accompanying drawings and more particularly pointed out in the appended claims.

In the drawings, Figure 1 is a view in elevation of a drilling machine embodying the present invention. Fig. 2 is a vertical section of the machine. Fig. 3 is a view in rear elevation of the support whereon the idler pulleys are mounted. Fig. 4 is a plan view of the upper portion of the machine frame. Figs. 5, 6, 7 and 8 are horizontal sections on the lines 5—5, 6—6, 7—7 and 8—8 of Fig. 2.

The machine frame comprises a lower portion 1, which is provided with an adjustable work table 2, and a hollow pedestal or standard 3 secured to the upper end of the base portion 1. A rearwardly projecting yoke-shaped bracket 4 is fixed to the upper end of the base portion 1, and a horizontal shaft 5, which preferably extends lengthwise of the machine, is journaled in the bracket. The counter-shaft 5 is driven from any suitable source of power. In the construction shown, it is provided with tight and loose pulleys 6 and 7, so that the machine may be connected by means of a belt to a suitable drive shaft. The machine is thrown into and out of operation by shifting the drive belt either onto the tight pulley 6 or the loose pulley 7. For this purpose a suitable belt shifter is mounted upon the bracket 4, and comprises a slidably mounted rod 8 carrying belt-engaging fingers or arms 9 on one end thereof, a shift lever 10 being connected to the sliding rod by a link 11. A driving pulley 12 for the machine is fixed to the counter-shaft 5, and this pulley preferably has but a single face and is flanged as shown.

The upright frame or standard 3 is provided at its upward end with forwardly projecting arms 13, which are provided with bearings 14 for the vertical drill spindle 15.

A multiple-stepped cone pulley 16 is mounted on the drill spindle between the bearings 14. This pulley is preferably provided with four steps so that the drill spindle may be driven at four different speeds from the drive pulley 12 on the counter-shaft. The spindle is vertically shiftable as usual through the bearings 14 and cone pulley 16.

A sleeve 17 mounted on the spindle is connected by a chain 18 with counter-balancing weight 19 within the hollow pedestal or standard 3, the chain passing over suitable guide pulleys 20.

A supporting bracket 21 for the sleeve 17 is adjustably clamped in the usual manner upon a guide 22 at the front of pedestal or standard 3. The bracket 21 is provided with a feed shaft 23 having a pinion 24 thereon which engages a rack 25 fixed to the sleeve 17.

A quarter-turn belt 26 connects the drive pulley 12 on the counter-shaft 5 with the stepped driven pulley 16 on the spindle and is guided by a pair of idler pulleys 27 and 28 mounted at the upper rear portion of the machine frame. The belt passes upwardly from the driving pulley 12 over the guide pulley 27, which may be termed the delivery idler, thence around one of the driven pulleys 16 and back over the guide pulley 28 which may be termed the return idler and thence back to the driving pulley.

A means is provided for adjusting the guide pulleys vertically so that the belt will properly track with any of the four steps of the cone pulley 16, and means is also provided for adjusting at least one of the idler pulleys, and preferably both, to properly tension the belt. For this purpose the brackets 29 whereon the idler pulleys 27 and 28 are journaled are secured to the ends of a horizontal sliding carriage 30. The brackets 29 preferably fit upon the end bars of the carriage 30, and are rigidly secured thereto by bolts 31. The carriage is mounted to slide horizontally in suitable guides 32 formed upon the upper edges of the side portions of a triangular bracket or support 33. The bracket or support 33 is in the form of a hollow casting and is mounted to slide vertically upon a guide 34 at the upper rear portion of the standard 3.

The vertical feed screw 35 is journaled at its lower end in a rearwardly projecting lug 36 on standard 3. The screw extends upwardly between the side portions of the bracket or support 33 and engages two threaded sleeves or nuts 37 which are fixed within openings in a pair of lugs 38 that project rearwardly from the front wall of the bracket 33. A horizontal adjusting shaft 39 extends from front to rear through the standard 3 and is journaled in suitable bearings carried by the standard. Its rear end extends through a vertical slot 40 in the front wall of the bracket 33 and a pair of beveled gears 41 connect the rear end of the adjusting shaft 39 to the feed screw 35. The front end of the shaft 39 is provided with a hand-wheel 42 within convenient reach of the operator, so that the screw 35 may be readily rotated to adjust the support or bracket 33 in vertical direction. By this means the idlers 27 and 28 may be adjusted vertically as indicated in dotted lines in Fig. 2, to cause the belt to track with any one of the steps of the cone pulley 16, and thereby rotate the spindle at four different rates of speed.

In order that the portion of the belt between the multiple-stepped pulley 16 and the return idler 28 shall properly track with the latter, a vertical guide roller 43 is journaled in suitable bearings in the arms 13 of the standard 3 and is arranged to engage the return portion of the belt as it leaves any one of the steps on the cone pulley 16. The guide roller 43 is so positioned that the return portion of the belt will approach the return idler 28 in the central plane thereof. Preferably also the second vertical guide roller 44 is arranged to engage the delivery portion of the belt between the delivery idler 27 and the cone pulley 16. The guide rollers 43 and 44 are arranged to engage the delivery and return portions of the belt in all of the different adjusted positions of the idler pulleys 27 and 28 and the arrangement is such that the flat quarter-turn belt 26 will always track with the guide pulleys and with the different steps of the driven pulley 16.

To place the belt under proper tension the carriage 30 is adjusted upon the guides 32 by a horizontal feed screw 45, which is journaled in a bearing at the front edge of the bracket or support 33 and engages a threaded sleeve or nut 46 fixed to the front portion of the carriage 30. The front end of the shaft 45 extends through a slot 47 in the upper end of the pedestal and is connected by a universal joint 48 to one end of a coupling shaft 49. The opposite end of the coupling shaft 49 is connected by a universal joint 50 to a horizontal adjusting shaft. The latter is formed of telescoping sections and comprises an inner section 51 connected directly to the joint 50 and a tubular section 52 to which the inner section is keyed. The tubular section is journaled in suitable bearings formed upon a member 53 secured to the lower arm 13 of the pedestal 3. A crank or hand-wheel 54 is fixed to the front end of the tubular shaft 52 so that the screw 29 may be rotated through the medium of the connections described to adjust the carriage 30 in horizontal connection, and thereby place the drive belt 26 under proper tension. The feed screw 45 is of course adjusted vertically with the bracket or support 33, but the coupling shaft 49 and coupling or adjusting shaft comprising the sections 51 and 52 maintain proper connections between the hand-wheel 54 and the adjusting screw 45 in all the different positions of the latter.

By means of the adjustment described the belt may be easily and quickly adjusted to drive the spindle at different speeds. Inasmuch as the counter-shaft 5 extends longitudinally of the machine, it may be employed to drive the separate spindles of a multiple drill. Preferably, the vertically adjustable support or bracket 33 is provided with a series of marks or lugs 55 which cooperate with a lug 56 on the machine frame to indicate the different adjusted positions of the support and of the idlers carried thereby.

It is obvious that changes may be made in the details set forth without departure from the essentials of the invention as defined in the claims.

I claim as my invention:—

1. In a machine of the class described, the combination with the frame, counter-shaft and spindle, of a driving pulley on said shaft, a multiple-stepped, driven pulley on said spindle, a quarter-turn belt connecting said pulleys, delivery and return idlers for said belt, a vertically shiftable support on said frame, a horizontally sliding carriage on said support and whereon said idlers are mounted, means for adjusting said support and said carriage to tension the belt and cause the same to track with any one of the steps of said driven pulley, and vertical rollers for guiding the portions of the belt between said driven pulley and said idlers in the different adjusted positions of the latter, substantially as described.

2. In a machine of the class described, the combination with the frame, counter-shaft and spindle, of a driving pulley on said shaft, a multiple-stepped, driven pulley on said spindle, a quarter-turn belt connecting said pulleys, delivery and return idlers for said belt, a vertically shiftable support on said frame, a horizontally sliding carriage on said support and whereon said idlers are mounted, means for adjusting said support and said carriage to tension the belt and cause the same to track with any one of the steps of said driven pulley, and a vertical guide roller for causing the belt to track with said return idler, substantially as described.

3. In a machine of the class described, the combination with the frame, counter-shaft and spindle, of a driving pulley on said shaft, a multiple-stepped driven pulley on said spindle, a quarter-turn belt connecting said pulleys, delivery and return idlers for said belt, a vertically shiftable support on said frame, a horizontally sliding carriage on said support and whereon said idlers are mounted, means for adjusting said support and said carriage to tension the belt and cause the same to track with any one of the steps of said driven pulley, and vertical rollers on the machine frame for guiding the portions of the belt between said stepped pulleys and said idlers, substantially as described.

4. In a machine of the class described, the combination with a counter-shaft and spindle, of a drive pulley on said shaft, a multiple-stepped driven pulley on said spindle, a quarter-turn belt connecting said pulleys, delivery and return idlers, means for adjusting said idlers vertically to cause said belt to track with any one of the steps of said driven pulley, means for adjusting the tension of the belt, and vertical rollers for guiding the portions of the belt between said idlers and said stepped pulley, substantially as described.

5. In a machine of the class described, the combination with a counter-shaft and spindle, of a drive pulley on said shaft, a multiple-stepped driven pulley on said spindle, a quarter-turn belt connecting said pulleys, delivery and return idlers, means for adjusting said idlers vertically to cause said belt to track with any one of the steps of said driven pulley, means for adjusting the tension of the belt, and a vertical guide roller for causing the belt to track with said return idler, substantially as described.

6. In a machine of the class described, the combination with a counter-shaft and spindle, of a drive pulley on said shaft, a multiple-stepped driven pulley on said spindle, a quarter-turn belt connecting said pulleys, delivery and return idlers, means for adjusting said idlers vertically to cause said belt to track with any one of the steps of said driven pulley, means for adjusting the tension of the belt, a vertical roller on the frame for guiding the portion of the belt between said stepped pulley and said return idler, substantially as described.

7. In a machine of the class described, the combination with the frame, of a vertical spindle at the front of the machine frame, a horizontal counter-shaft at the rear thereof, a drive pulley on said shaft, a multiple-stepped, driven pulley on said spindle, a quarter-turn belt connecting said pulleys, a support mounted at the upper back portion of the machine frame, delivery and return idlers for said belt mounted on said support, a screw for vertically adjusting said support to cause said belt to track with any one of the steps of said driven pulley, a horizontal adjusting shaft journaled on the machine frame and provided with a hand wheel on its outer end and beveled gears connecting said adjusting shaft and said screw, substantially as described.

8. In a machine of the class described, the combination with the frame, of a vertical spindle at the front of the machine frame, a horizontal counter-shaft at the rear thereof, a drive pulley on said shaft, a multiple-stepped driven pulley on said spindle, a quarter-turn belt connecting said pulleys, a support mounted at the upper back portion of the machine frame, delivery and return idlers for said belt mounted on said support, means for adjusting said support vertically to cause the belt to track with any one of the steps of said driven pulley, means for adjusting an idler to tension the belt, hand-wheels at the front of the machine frame and connections between said hand-wheels and said separate adjusting means, substantially as described.

9. In a machine of the class described, the combination with the frame, of a vertical spindle at the front of the machine frame, a horizontal counter-shaft at the rear thereof, a drive pulley on said shaft, a multiple-stepped, driven pulley on said spindle, a quarter-turn belt connecting said pulleys, a support mounted at the upper back portion of the machine frame, delivery and return idlers for said belt mounted on said support, means for adjusting said support vertically to cause the belt to track with any one of the steps of said driven pulley, a horizontal adjusting screw on said support to tension the belt, a hand-wheel mounted at the front of the machine frame, and a coupling shaft connected by universal joints to said hand-wheel and said screw, substantially as described.

10. In a machine of the class described, the combination with the machine frame, of a spindle at the upper front portion of the frame, a multiple-stepped, driven pulley thereon, a horizontal counter-shaft on the lower rear portion of the frame, a drive pulley thereon, a quarter-turn belt connecting said pulleys, a vertically movable support at the upper rear portion of the frame, a horizontally sliding carriage on said support, delivery and return idlers for the belt mounted on said carriage, a vertical screw on the frame for adjusting said support, a horizontal screw on said support for adjusting said carriage, and hand-wheels mounted at the front of the machine frame and connected to said screws, substantially as described.

JOHN G. HEY.

Witnesses:
A. R. CROSMAN,
J. G. ANDERSON.

Copies of this patent may be obtained for five cents each, by addressing the "Commissioner of Patents, Washington, D. C."